United States Patent [19]
McGough

[11] Patent Number: 5,896,700
[45] Date of Patent: Apr. 27, 1999

[54] DEVICE FOR WATERING UNATTENDED HOUSEPLANTS

[76] Inventor: Charles B. McGough, 27 Deepwells La., St. James, N.Y. 11780

[21] Appl. No.: 08/731,018

[22] Filed: Oct. 9, 1996

[51] Int. Cl.[6] .................................................. A01G 29/00
[52] U.S. Cl. ................................................. 47/48.5
[58] Field of Search ..................................... 47/48.5, 1.01

[56] References Cited

U.S. PATENT DOCUMENTS

| | | | |
|---|---|---|---|
| 2,791,347 | 5/1957 | Boehm | 47/48.5 |
| 4,785,575 | 11/1988 | Shioi | 47/48.5 |
| 4,970,823 | 11/1990 | Chen et al. | 47/48.5 |
| 5,172,515 | 12/1992 | Lapshansky, Sr. et al. | 47/48.5 |
| 5,259,142 | 11/1993 | Sax | 47/48.5 |
| 5,443,544 | 8/1995 | Azoulay | 47/48.5 |

FOREIGN PATENT DOCUMENTS

| | | | |
|---|---|---|---|
| 1217816 | 5/1960 | France | 47/48.5 |
| 1151974 | 7/1963 | Germany | 47/48.5 |

*Primary Examiner*—Michael J. Carone
*Assistant Examiner*—Joanne C. Downs

[57] ABSTRACT

This invention is a device for automatically watering unattended houseplants with ordinary tap water. The device controls the rate of discharge of water from a reservoir by means of a replaceable multilayer sandwich-type flow control wafer, which is made of several layers of deformable gasket material, laboratory filtration paper, and thin flexible plastic. The gasket and plastic layers contain designed patterns of through-holes and passages which force the water to flow over and through the filtration paper to control the rate of release of water from the reservoir. The design also uses the filtration paper to remove particles from the tap water which could clog the system and stop the flow. Over the course of the watering cycle the water gradually loosens the adhesive bonds between the filtration paper and the plastic, which increases the effective flow area of the filtration paper to partially compensate for the reduction in pressure head which occurs as the reservoir empties, thus keeping the water flow rate more constant over the watering cycle than it would be if controlled only by a simple orifice or filter. The watering device includes registration and compression rings which position and seal the flow control wafer, a concave funnel-like reservoir opening for filling the device in situ, and a narrow integral spike which supports the device in the plant soil and creates an open vertical passage which facilitates water penetration deep into the plant's root system.

6 Claims, 4 Drawing Sheets

DEVICE FOR WATERING UNATTENDED HOUSEPLANTS

BACKGROUND OF THE INVENTION

1. Technical Field

This invention pertains to the field of plant husbandry (Class 047).

2. Description of the Prior Art

Many prior devices have been suggested for irrigating unattended houseplants, and a number of these have received U.S. patents. These devices, however, have not been widely accepted and only one is known to be currently marketed in the U.S.

U.S. Pat. No. 5,443,544 (Azoulay) describes a complex, relatively expensive device using wicks and water-absorbing sponge to transfer water to the plant. The wicks and sponges in this device appear to be susceptible to clogging from impurities normally present in tap water, and thus would require inconvenient cleaning or replacement. U. S. Pat. No. 4,970,823 (Chen and Parkhurst) describes another wick-type system for dispensing water from a bottle reservoir to the soil. This system also appears to be susceptible to plugging from particulates in the water as the wicks are not readily replaceable, and the rate at which water is released from the unvented reservoir appears to depend on ambient pressure and temperature, water level, and soil conditions. U.S. Pat. No. 4,578,897 (Pazar and Petrick) describes a system for dispensing water to a water dish below the plant. This system is complex and appears to be dependent on soil conditions and the skill of the operator. U.S. Pat. No. 4,336,666 (Caso) describes a toroidal-shaped device which requires the operator to punch holes in the "metering nozzles" to obtain the desired flowrate—a scheme which seems impractical, since even very small punched holes will provide too rapid a flowrate for the intended use. U.S. Pat. No. 4,300,309 (Mincy) uses a "porous soil penetrating member" to dispense water from a semi-toroid shaped reservoir to the soil. This device will be susceptible to plugging from water impurities and would be complex and expensive to manufacture. Similarly, U.S. Pat. Nos. 4,089,133 (Duncan), 2,837,869 (Chatten), 2,595,783 (Epstein), and 2,375,860 (Markham) attempt to solve this problem with various wicking, porous ceramic absorption, manually controlled seepage, or multiple aperture devices. All have major disadvantages and, like the other devices described above, are dissimilar in principle to the invention described herein.

U.S. Pat. No. 5,259,142(Sax) is superficially similar to the device disclosed herein, however it contains a number of fundamental design differences. The '142 patent employs a simple filter to restrict the flow of water from the bottle. This design will inherently release the water most rapidly when the bottle is full and the static pressure head is highest, and very slowly when the bottle is nearly empty. The '142 device also provides no means of preventing the filter from becoming clogged by impurities in the water, nor means of sealing its filter disk against peripheral leakage. The device also requires disassembly for filling or refilling. All of these problems are avoided in the invention described herein.

Another automatic houseplant watering device has recently appeared on the market. This device, labeled "patent pending", employs a wick system similar to the Azoulay device, combined with a siphon system, to release water intermittently to a plant. The device operates on a principle completely different from the invention described herein, and appears to have serious disadvantages in the areas of complexity of operation, relative size, performance reliability, and cost.

SUMMARY OF THE INVENTION

This invention is a device which dispenses a quantity of water (typically 32 or 16 ounces) to a houseplant over an extended period of time (typically 1 to 2 weeks) without owner intervention. The device is completely passive, operating by gravity flow, uses standard tap water, and solves a number of problems of previous houseplant watering devices.

The device is comprised of three major components: (1) a reservoir consisting of a cylindrical-shaped clear or translucent plastic bottle with a concave-shaped top with filling opening and a threaded lower exit neck; (2) a base assembly consisting of a matching threaded cap and a narrow tapered spike which supports the reservoir and provides an open path for passage of water into the plant root region, and (3) a disk-shaped sandwich-type replaceable wafer constructed of several layers of deformable gasket material, laboratory filtration paper, and thin plastic, with through-holes and passages so constructed as to filter impurities from the water and to control the rate at which water is released from the reservoir during the desired watering period.

The major advantages of this device are: It reliably and efficiently dispenses the full capacity of the reservoir over the specified period; it releases its water at a relatively uniform rate during the watering the cycle; it can use tap water containing impurities and still perform reliably; its performance is not affected by ambient or soil conditions; it is simple to install and operate; and it is inexpensive to manufacture.

DESCRIPTION OF PREFERRED EMBODIMENTS

Figure 1:
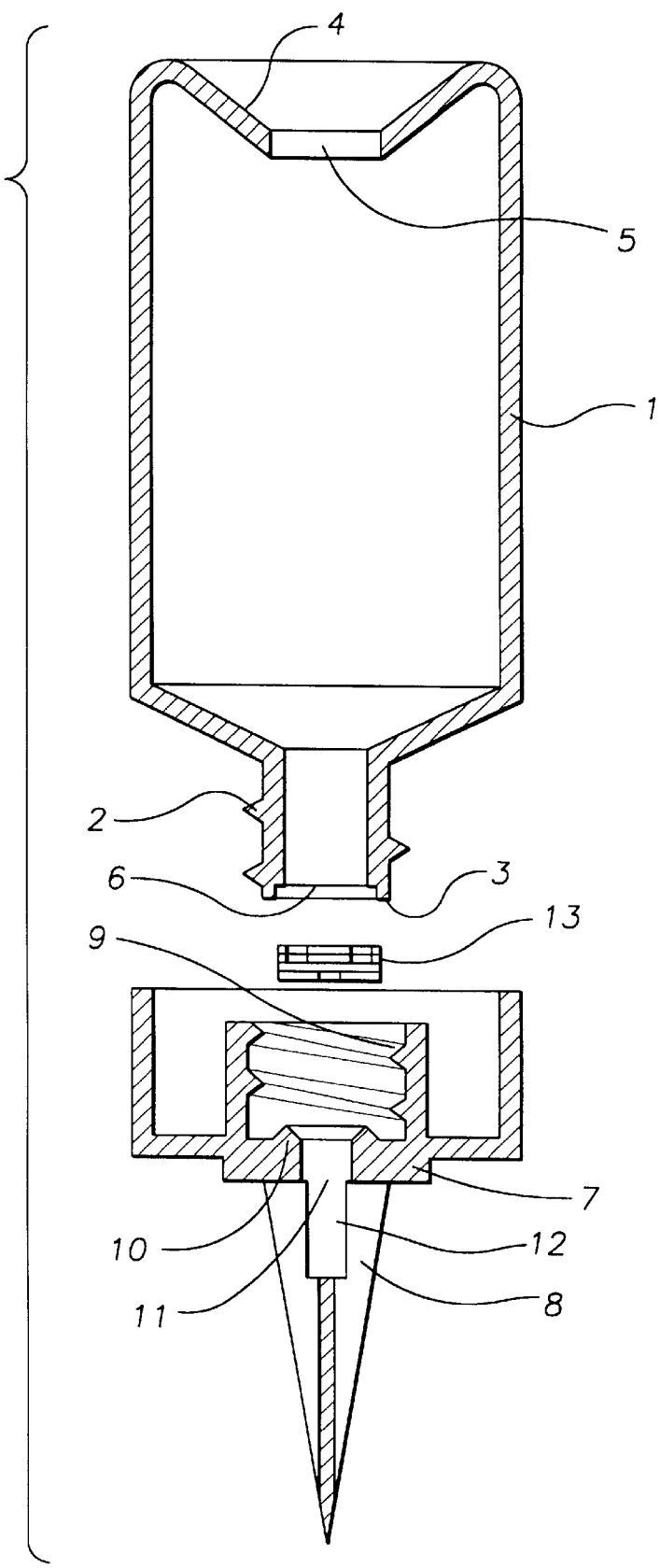
FIG. 1 is a cross-sectional view of the disassembled plant watering device showing the three major components (reservoir, flow control wafer, and base assembly)
Figure 2A:
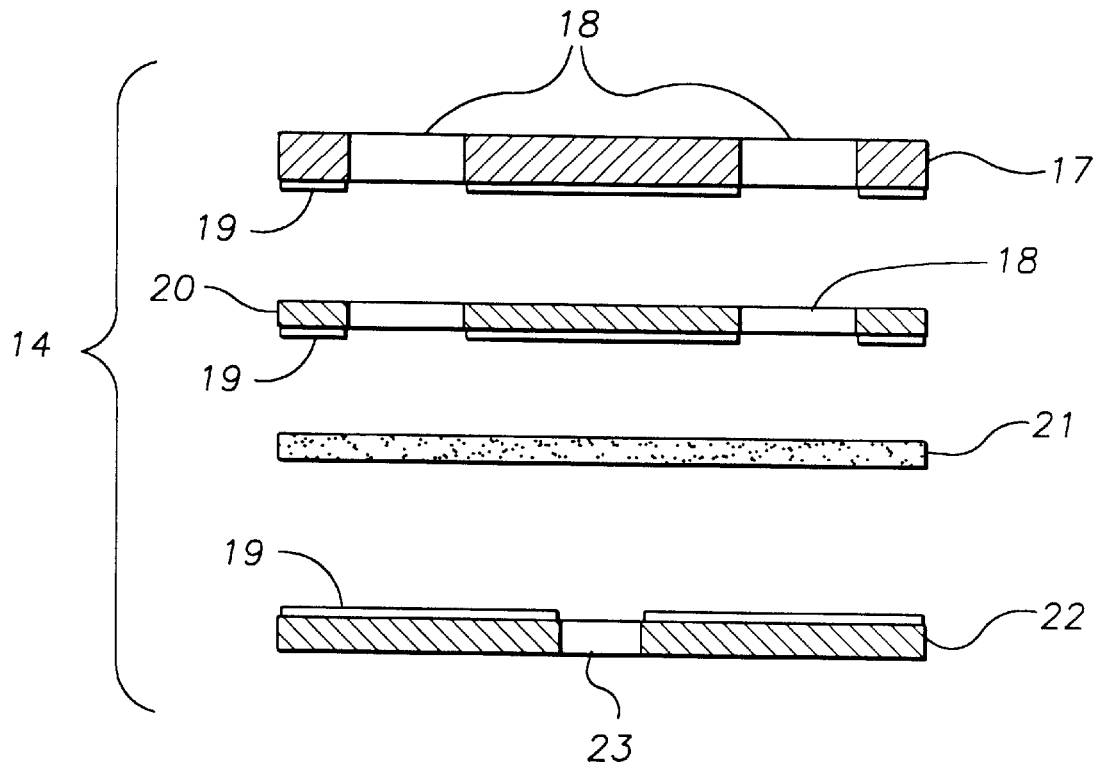
FIG. 2a is an exploded cross-sectional view of a typical flow control wafer showing its individual components prior to assembly.
Figure 2B:
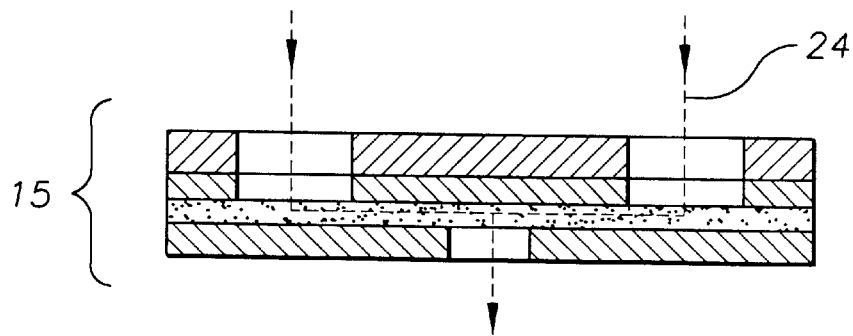
FIG. 2b is a cross-sectional view of the flow control wafer after assembly, illustrating a typical flow path of the water as it passes from the reservoir through said flow control wafer.
Figure 3:
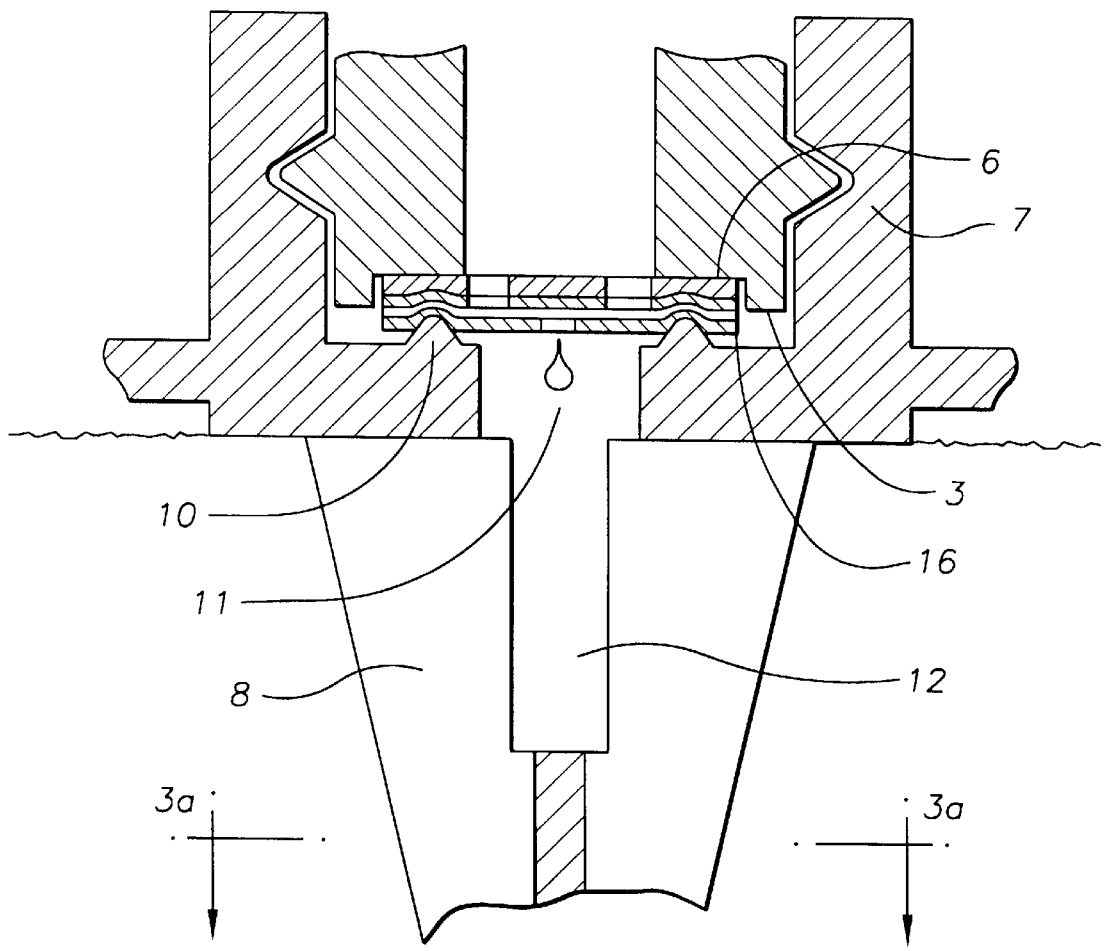
FIG. 3 is a cross-sectional view of a typical flow control wafer installed in the watering device, illustrating the method of sealing against peripheral water leakage by compressing the malleable flow control wafer between the base assembly compression ring and the reservoir neck lower surface.
Figure 3A:
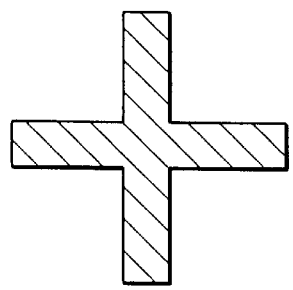

The houseplant watering device consists of three principal components; (1) a water reservoir, (2) a base assembly, and (3) a multi-layered disk-shaped component herein called a flow control wafer. These components are illustrated in FIGS. 1, 2, and 3 and described below.

Water Reservoir: The water to be supplied to the plant is contained in a cylindrical-shaped reservoir 1 typically made of clear or translucent HDPE plastic and having sufficient volume to provide water to the plant for approximately two weeks. It has been found that a 32 ounce reservoir is suitable for plants contained in 10 inch diameter pots or larger, and a 16 ounce reservoir is suitable for smaller plants. This invention is not intended to be limited to these specific sizes. More than one watering device may be used for very large plants or indoor trees. The reservoir contains a male threaded exit neck 2 having an opening smaller than the reservoir diameter, with a smooth, flat lower surface 3 suitable for sealing. It has been found that a 0.8125-inch inside diameter neck works well for this device, although other neck diameters may also be used. The top of the reservoir contains a funnel-like concave-shaped depression 4 with a hole at its base 5 so that the device may be easily filled in situ after installation in the plant, using a standard watering can. The top opening also provides venting so that atmospheric pressure is maintained in the reservoir as it empties.

The reservoir exit neck lower surface includes a low (e.g. 0.040 inch) raised outer registration ridge 6 so that the flow control wafer can be easily placed in its correct position by the operator during installation. This registration ridge shall be slightly greater in diameter than the cap compression ring (see below) to prevent interference with the sealing.

Base Assembly: The base assembly 7 serves five major functions: (1) It supports the device by means of a narrow tapered spike 8 having a cruciform-shaped cross section, inserted into the plant soil, (2) It contains a matching female threaded joint 9 used to attach the base assembly to the male threaded exit neck of the reservoir, (3) It contains a raised compression ring 10 at the base of the threads, which is slightly larger in diameter than the inside diameter of the reservoir neck. This compression ring tightly compresses the flow control wafer (described below) against the lower flat surface of the reservoir exit neck 3 to prevent water leakage, (4) It provides a small outlet plenum 11 with a bottom opening to allow free passage of the water into said support spike, (5) It provides, by means of an open center section in the upper region of said support spike 12, a vertical passage in the soil which facilitates water flow to below the soil surface to minimize evaporation and to allow the water to penetrate more easily into the plant root system.

Flow Control Wafer: The replaceable flow control wafer 13 is a key element of this invention. The flow control wafer is a circular-shaped multilayered disk, typically 1 inch in diameter and 0.055 inch or less in thickness. It is shown in exploded view 14, assembled 15, and tightly sealed between the reservoir exit neck and the base assembly by the compression ring 16 . The functions of the various layers of the flow control wafer are:

1. Layer 1 is a deformable material (e.g. rubber or soft plastic) disk or O-ring approximately 1.0 inch in diameter 17. It serves as a gasket which creates a seal between the reservoir exit neck and the flow control wafer to prevent circumferential leakage from the reservoir. The Layer 1 disk or O-ring contains one or more through-holes or passages 18 which allow free passage of water from the reservoir to the layer below. Layer 1 may or may not have adhesive 19 on its lower surface to bond it to Layer 2.

2. Layer 2 is a smooth, flexible plastic disk 20 with adhesive on its lower surface 19. This disk is approximately 0.005 inches thick and has through-holes directly below the through-holes or passages of Layer 1.

3. Layer 3 is a disk made from one or more layers of laboratory grade filtration paper 21. The specific paper type has been selected through testing to filter impurities from the water and to provide a relatively uniform flowrate for a specified watering cycle with the desired reservoir capacity (typically 32 or 16 ounces). If more than one layer of filtration paper is used, a layer of thin plastic, smaller in diameter than the filtration paper disks, may be inserted between the paper layers to create a more labyrinthine water flow path.

4. Layer 4 is a smooth, flexible plastic disk approximately 0.005 inches thick 22 with adhesive on its upper surface 20. This disk also contains one or more through-holes which may or may not be aligned with the hole pattern of Layer 2. Layer 4 is bonded to the lower surface of the Layer 3 filtration paper by means of adhesive on its top surface.

After bonding, the assembly comprising Layers 1, 2, 3, and 4 is compressed to remove entrapped air. The completed flow control wafer is a rugged, one-piece, semi-flexible, replaceable disk.

The sandwich configuration of the flow control wafer in which one or more layers of laboratory filtration paper are bonded between two or more thin disks having various hole patterns, forces the water to enter the top hole pattern and flow vertically and horizontally through and over the paper to reach the exit hole or holes in the lower plastic disk 24. At the beginning of the cycle, when the reservoir is full and the hydraulic pressure on the filtration paper is highest, the flowrate would be excessively high if allowed to pass directly through the paper without being forced to follow the labyrinthine path of the multilayer flow control wafer. This restricted path initially reduces the equivalent "frontal area" available to the water as it passes from the reservoir, through the filtration paper, and into the base assembly. However, as the water saturates the filtration paper it gradually loosens the adhesive which bonds the paper to the plastic layers. Therefore, two partially compensating effects are occurring simultaneously; (1) the hydraulic pressure above the flow control wafer is decreasing as the water level in the bottle drops, and (2) the filtration paper frontal area is increasing and the effective distance through which the flow passes is decreasing as the paper-to-plastic bonds are loosened by the water. This effect, herein termed "flow compensation", enables the watering device to deliver a more constant flow of water to the plant over time than can be achieved by a simple gravity flow device.

The flow compensation effect can be understood by examining Poiseuille's equation(1), which governs the laminar flow of a liquid through a porous medium, $$F = KPA/L$$

where, in any compatible units,

F=flowrate through the filter
P=hydraulic static pressure on the filter
A=effective frontal filter flow area
L=distance through which fluid flows through the medium
K=filter medium permeability constant 1. Brown, George G. and Associates, Unit Operations, (New York, John Wiley & Sons,1955, p. 217.

This equation shows that an increase in the flow area, A, and/or a decrease in the flow path length, L, will tend to partially compensate for the decrease in the pressure head, P, which occurs as the reservoir empties, thus keeping the flowrate, F, more nearly constant.

Figure 4:
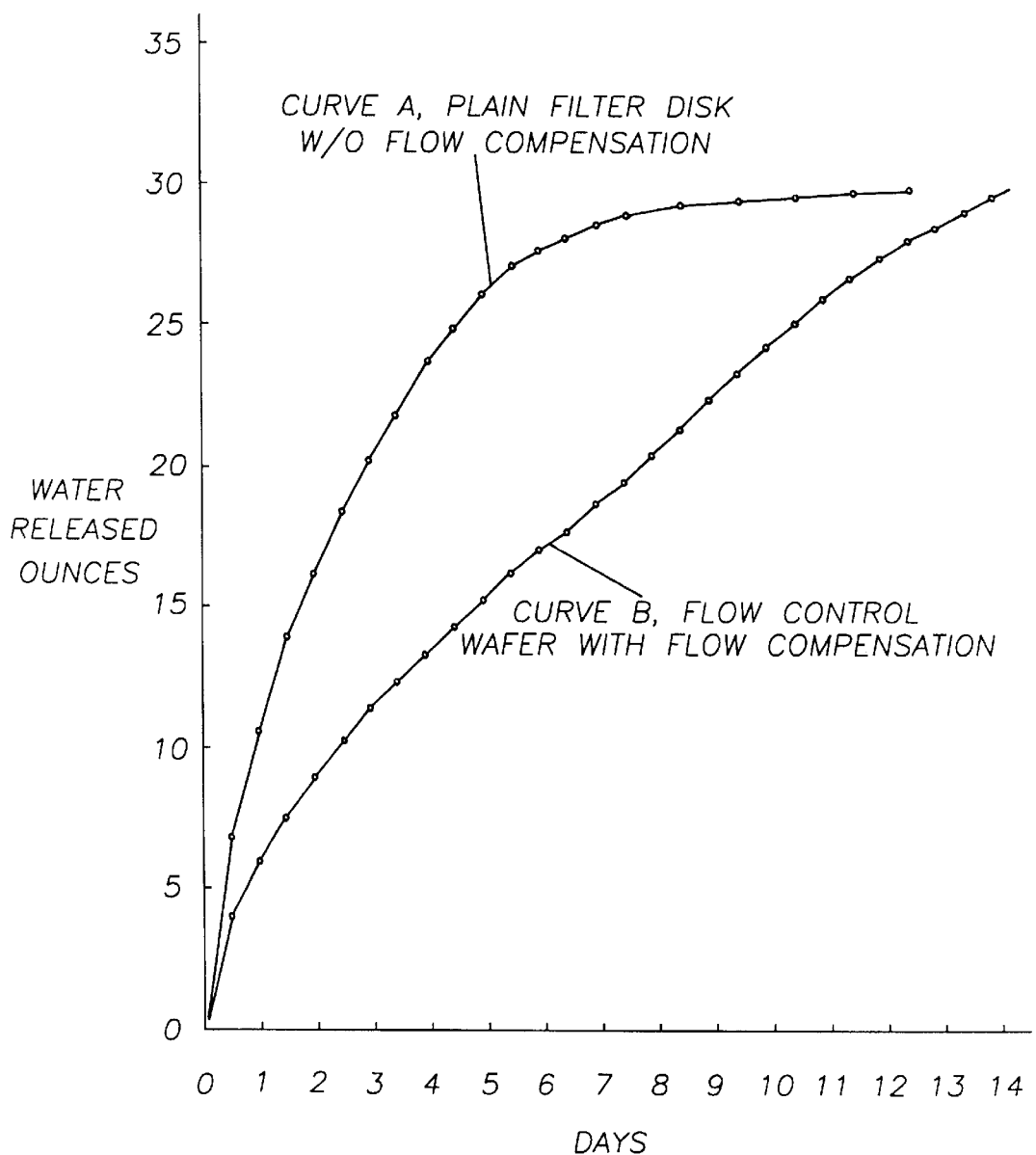
FIG. 4 is a graph illustrating the comparatively constant water release rate of the flow control wafer, compared to the more non-uniform release rate typical of a simple filter device.

The flow compensation effect has been demonstrated in tests performed by the inventor. FIG. 4 shows the cumulative volume of water discharged in a typical test from a 30 ounce reservoir over a fourteen day period, using both a flow control wafer with flow compensation and a plain filter without flow compensation. As can be seen from these data, the simple filter system without flow compensation (Curve A) discharged the water rapidly, consuming 80% of the water (24 ounces) in the first four days, with only 20% (6 ounces) available to the plant in the remaining ten days of the cycle. The flow control wafer with flow compensation (Curve B), however, restricted the flow path early in the cycle and dispensed more water later in the watering period when it is most needed by the plant. The data from these tests show that at the same four day point where the non-compensated filter disk used 80% of the water, the compensated flow control wafer used only 43%, conserving 57%, or 17 ounces, for the remaining ten days of the cycle.

Many variations in detail may be made to the preferred embodiment described above without altering the basic principles of the invention. These include: the filtration paper manufacturer, model, thickness, and/or permeability; the number, size, and location of through-holes and passages in the flow control wafer; the deformable gasket material and configuration (e.g. rubber, vinyl, soft plastic materials; disk or O-ring configuration); the diameters of the reservoir neck opening and flow control wafer; the reservoir and base assembly materials of construction; support spike configurations, including circular and other cross-sections, various lengths, and other similar variations thereof.

The preferred embodiment, and all variations thereof, are manufactured entirely of standard, low-cost, commercially available materials, and require very little labor. The device can therefore be produced at low cost which will make it practical to manufacture and distribute to the consumer market.

What is claimed is:

1. A device for automatically watering unattended houseplants, said device comprising a water reservoir having a bottom threaded exit neck with a flat lower surface, and a top filling and venting opening; a base assembly constructed of hard plastic and having a threaded joint which mates to said bottom threaded exit neck of said water reservoir, and having a bottom opening through which water can pass into an upper section of a narrow tapered spike which supports said houseplant watering device and allows passage of water into the soil of a houseplant; and a replaceable disk-shaped flow control wafer, which is retained between said exit neck of said water reservoir and said threaded joint of said base assembly, said flow control wafer comprising a top layer of deformable gasket material having one or more through-holes; a second layer located directly below said top layer, said second layer consisting of a sheet of thin plastic material having a pattern of one or more through-holes; a third layer located directly below said second layer, said third layer consisting of one or more sheets of filtration paper having no through-holes, in which said sheets of filtration paper may or may not be separated by a thin layer of plastic material having no through-holes and having a diameter slightly smaller than the diameter of said one or more sheets of filtration paper; and a fourth layer located directly below said third layer, said fourth layer consisting of a sheet of thin plastic material having one or more through-holes; so that the arrangement of said layers of gasket material, filtration paper, and plastic sheets forces the water to follow a predetermined labyrinthine path as it flows from said water reservoir into said base assembly; so that said water reservoir, base assembly, and flow control wafer, when assembled together, comprise a leak-tight, compact device capable of dispensing water to a houseplant over a predefined period of time.

2. The device described in claim 1 wherein said one or more sheets of filtration paper are commercially-available laboratory filtration paper having the same or different porosities, with said porosities selected to provide a water release rate consistent with an intended watering period for said houseplant, and to remove impurities in the water which would clog said watering device and impede the flow of water to the houseplant.

3. The device described in claim 1 wherein said flow control wafer is comprised of layers of said deformable gasket material, said sheets of filtration paper, and said sheets of thin plastic material, with said gasket and plastic layers having said patterns of through-holes, and said sheets of filtration paper having no through-holes, so that, when said layers of deformable gasket material, filtration paper, and thin plastic are bonded by adhesives to one another in a sandwich configuration to form a single integrated wafer, said wafer filters the water and forces the water to flow through the wafer in a predetermined path, which path becomes less restrictive as the adhesives are gradually unbonded by the dissolving action of the water, which unbonding partially compensates for a reduction of pressure head as said water reservoir gradually empties, which enables said houseplant watering device to release the water to the houseplant at a relatively uniform rate.

4. The device described in claim 1 wherein said base assembly contains a sealing system consisting of a circular narrow raised ridge located directly below said flat lower surface of said reservoir exit neck, so that said raised ridge tightly compresses said flow control wafer against said flat lower surface of said exit neck of said water reservoir to prevent peripheral leakage of water into said threaded joint between said reservoir exit neck and said base assembly, thus ensuring that all water passes through said flow control wafer.

5. The device described in claim 1 wherein said flow control wafer is held in position directly below said water reservoir exit neck by means of a positioning and retaining system consisting of said reservoir exit neck having said flat lower surface made with a shallow raised outer ridge, said raised outer ridge being slightly larger in diameter than said flow control wafer, so that easy and accurate positioning and retention of said flow control wafer can be achieved during threading of said water reservoir to said base assembly of said houseplant watering device.

6. The device described in claim 1 wherein said narrow tapered spike contains a hollow vertical center section in an upper region thereof with horizontal side openings, so that, when said narrow tapered spike is inserted fully into the soil of a houseplant to support said houseplant watering device, said hollow vertical center section creates a vertical path in the houseplant soil equal to the length of said hollow vertical center section of said narrow tapered spike, which allows water to pass directly from said flow control wafer down said hollow vertical center section of said narrow tapered spike and directly into the root system of a houseplant.

* * * * *